United States Patent
Saeed et al.

(10) Patent No.: US 9,556,295 B2
(45) Date of Patent: *Jan. 31, 2017

(54) SUPPORTED DONOR MODIFIED ZIEGLER-NATTA CATALYSTS

(71) Applicant: Borealis AG, Vienna (AT)

(72) Inventors: Irfan Saeed, Helsinki (FI); Esa Kokko, Vantaa (FI); Paivi Waldvogel, Porvoo (FI); Marja Mustonen, Koskenkylansaha (FI); Thomas Garoff, Helsinki (FI)

(73) Assignee: Borealis AG (AT)

( * ) Notice: Subject to any disclaimer, the term of this patent is extended or adjusted under 35 U.S.C. 154(b) by 0 days.

This patent is subject to a terminal disclaimer.

(21) Appl. No.: 14/783,668

(22) PCT Filed: Apr. 28, 2014

(86) PCT No.: PCT/EP2014/058531
§ 371 (c)(1),
(2) Date: Oct. 9, 2015

(87) PCT Pub. No.: WO2014/177480
PCT Pub. Date: Nov. 6, 2014

(65) Prior Publication Data
US 2016/0060372 A1   Mar. 3, 2016

(30) Foreign Application Priority Data

Apr. 30, 2013 (EP) .................................... 13165940

(51) Int. Cl.
| | |
|---|---|
| *B01J 31/00* | (2006.01) |
| *B01J 37/00* | (2006.01) |
| *C08F 4/02* | (2006.01) |
| *C08F 4/60* | (2006.01) |
| *C08F 4/44* | (2006.01) |
| *C08F 2/00* | (2006.01) |
| *C08F 210/08* | (2006.01) |
| *C08F 210/16* | (2006.01) |

(52) U.S. Cl.
CPC ........... *C08F 210/08* (2013.01); *C08F 210/16* (2013.01)

(58) Field of Classification Search
CPC ....... C08F 10/00; C08F 210/16; C08F 110/06; C08F 36/04; C08F 14/06; C08G 61/08
USPC .......................... 502/125, 126; 526/209, 142
See application file for complete search history.

(56) References Cited

U.S. PATENT DOCUMENTS

| | | | |
|---|---|---|---|
| 5,391,654 A | 2/1995 | Ahvenainen | |
| 2007/0032618 A1* | 2/2007 | Varzeshkhah | C08F 210/16 526/124.3 |
| 2015/0315316 A1* | 11/2015 | Jayaratne | C08F 210/16 502/154 |

FOREIGN PATENT DOCUMENTS

| | | |
|---|---|---|
| CN | 104870495 A | 8/2015 |
| EP | 0517868 B1 | 11/1995 |
| EP | 1481994 A1 | 12/2004 |
| EP | 2746306 A1 | 6/2014 |
| WO | 9618662 A1 | 6/1996 |
| WO | 2014096296 A1 | 6/2016 |

OTHER PUBLICATIONS

First Chinese Office Action dated May 5, 2016.

* cited by examiner

*Primary Examiner* — Alexa Neckel
*Assistant Examiner* — Elizabeth Eng
(74) *Attorney, Agent, or Firm* — Tarolli, Sundheim, Covell & Tummino LLP

(57) ABSTRACT

Procatalyst comprising an inorganic support, a chlorine compound carried on said support, a magnesium compound carried on said support, a titanium compound carried on said support, and a compound comprising two oxygen containing rings, wherein said two rings are linked via a bridge selected from the group consisting of carbon bridge, silicon bridge, ethane-1.2-diyl bridge, ethene-1,2-diyl bridge, alkylaminomethyl bridge and imine bridge.

15 Claims, No Drawings

SUPPORTED DONOR MODIFIED ZIEGLER-NATTA CATALYSTS

The present invention is directed to a new procatalyst, its preparation and its use in the preparation of ethylene homopolymer and copolymer.

Ziegler Natta catalysts, like supported Ziegler-Natta catalysts, are well known in the art. It is also known that such catalysts can be used in polymerization processes for producing ethylene copolymers. A great variety of Ziegler-Natta catalysts have been developed to fulfill the different demands in catalysis polymerization. One requirement in polyethylene polymerization is to obtain a polymer with rather narrow molecular weight distribution. Other important requirements are high activity and good co-monomer response. A Ziegler-Natta catalyst which contains tetrahydrofuran as electron donor shows good co-monomer response and enables to produce ethylene copolymers with narrow molecular weight distribution. However its activity tends to decrease compared to the catalyst without the tetrahydrofuran donor, i.e. the activity is not very high. Further nowadays HSE-(health, safety & environment) policies are an important factor in the production of catalysts and polymers. In other words the polymers must fulfill the strict health and environmental requirements of national and international institutions. Tetrahydrofuran has been recognized as a hazardous substance and thus must be replaced by non-toxic compounds having similar co-monomer response and ensures the preparation of polymers with rather narrow molecular weight distribution.

A further demand is to find catalyst systems which enable the production of polymers of rather high molecular weight.

Thus, the object of the present invention is to provide a catalyst and its manufacture, which has high co-monomer response, is environmentally friendly and sustainable and supports the preparation of polymers with rather narrow molecular weight distribution and rather high molecular weight. Further, it is highly desired that the catalyst has rather high activity, i.e. should be preferably on the same level as the catalyst without the donor.

The finding of the present invention is to replace tetrahydrofuran with a special bi(oxygen containing ring) compound.

Thus, a first aspect of the present invention is directed to a process for producing a procatalyst, wherein the process comprises the steps in the order of:
(a) contacting an inorganic support (IS) with an alkyl metal chloride (AMC) obtaining a first reaction product ($1^{st}$ RP),
(b) contacting said first reaction product ($1^{st}$ RP) with an electron donor compound (ED) obtaining a second reaction product ($2^{nd}$ RP), and
(c1) contacting said second reaction product ($2^{nd}$ RP) with a compound (M) or mixture (MI) obtaining a third reaction product ($3^{rd}$ RPa) and subsequently contacting said third reaction product ($3^{rd}$ RPa) with a titanium compound (TC) obtaining the procatalyst,
or
(c2) contacting said second reaction product ($2^{nd}$ RP) with a titanium compound (TC) obtaining a third reaction product ($3^{rd}$ RPb) and subsequently contacting said third reaction product ($3^{rd}$ RPb) with a compound (M) or mixture (MI) obtaining the procatalyst,
or
(c3) contacting said second reaction product ($2^{nd}$ RP) simultaneously with a compound (M) and a titanium compound (TC) or with a mixture (MI) and a titanium compound (TC) obtaining the procatalyst,
or
(c4) contacting said second reaction product ($2^{nd}$ RP) with a mixture of compound (M) and a titanium compound (TC) or with a mixture of a mixture (MI) and a titanium compound (TC) obtaining the procatalyst,
wherein
(i) the alkyl metal chloride (AMC) is of formula (I)

$$R_n MeCl_{3-n} \qquad (I)$$

wherein
R is a $C_1$-$C_{20}$ alkyl group,
Me is a metal of group 13 of the Periodic Table, and
n is 1 or 2,
(ii) the compound (M) and the mixture (MI) comprise a hydrocarbyl and/or hydrocarbyl oxide linked to magnesium, preferably the compound (M) linked to magnesium is of formula (II) and the mixture (MI) comprise different compounds of formula (II), wherein formula (II) is $$Mg(R)_n(OR)_{2-n},$$

where n is 0, 1 or 2,
each R can be the same or different hydrocarbyl group of 1 to 20 C atoms;
(iii) the titanium compound (TC) is of formula (III)

$$(OR')_{4-x}TiCl_x \qquad (III)$$

wherein
R' is a $C_2$-$C_{20}$ hydrocarbyl group and
x is an integer of 3 or 4, and
(iv) the electron donor compound (ED) is a compound (C) comprising two oxygen containing rings, wherein said two rings are linked via a bridge selected from the group consisting of carbon bridge, silicon bridge, ethane-1,2-diyl bridge, ethene-1,2-diylbridge, alkylaminomethyl bridge and imine bridge.

It has been surprisingly found out that the process according to this invention provides a catalyst which has a high co-monomer response, is environmentally sustainable and supports the preparation of polymers with rather narrow molecular weight distribution and rather high molecular weight. Furthermore, the catalyst has high activity.

When in the following reference is made to preferred embodiments or technical details of the inventive process, it is to be understood that these preferred embodiments or technical details also refer to the inventive procatalyst as well as the inventive catalyst and the inventive process for producing ethylene copolymer.

According to another aspect the present invention is directed to a procatalyst comprising
(a) an inorganic support (IS),
(b) a chlorine compound carried on said support,
(c) a magnesium compound carried on said support,
(d) a titanium compound carried on said support, and
(e) an electron donor compound (ED) being a compound (C) comprising two oxygen containing rings, wherein said two rings are linked via a bridge selected from the group consisting of carbon bridge, silicon bridge, ethane-1,2-diyl bridge, ethene-1,2-diyl bridge, alkylaminomethyl bridge and imine bridge.

A further aspect of the present invention is directed to a catalyst system comprising the procatalyst of the present invention and activating cocatalyst, preferably an activating cocatalyst being an organometallic compound of formula (V)

$$(R'')_{3-n}AlX_n \qquad (V)$$

wherein R'' is a $C_1$ to $C_{20}$ alkyl and n is 0, 1 or 2, X is halogen

A still further aspect of the present invention is directed to a process for producing ethylene copolymer, the process comprises:

(a) introducing the procatalyst of the present invention into a polymerisation reactor,
(b) introducing a cocatalyst, like a cocatalyst being an organometallic compound of formula (V) as defined above, capable of activating the said procatalyst into the polymerisation reactor
(c) introducing ethylene, optionally $C_3$-$C_{12}$ α-olefins and optionally hydrogen into the polymerisation reactor,
(d) maintaining said polymerisation reactor in such conditions as to produce an ethylene homo- or copolymer.

When in the following reference is made to preferred embodiments or technical details of the inventive process for producing a procatalyst, it is to be understood that these preferred embodiments or technical details also refer to the inventive procatalyst as well as the inventive catalyst system comprising the procatalyst and the inventive process for producing ethylene homo- or copolymer.

According to one embodiment of the present invention, the inorganic support (IS) is an inorganic oxide having surface hydroxyl groups, preferably silica.

According to another embodiment of the present invention, the metal Me of the alkyl metal chloride (AMC) of formula (I) is Al.

Preferably the compound (C) of the present invention is of formula (IV)

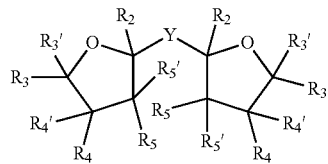

wherein
Y is selected from the group consisting of $C(R_1)_2$, $Si(R_1)_2$, $CHR_1$—$CHR_1$, $CR_1$=$CR_1$, $CHR_1$—$NR_1$ and $CR_1$=$N$, wherein each $R_1$ can be the same or different and can be hydrogen, a linear or branched $C_1$ to $C_8$-alkyl group, or a $C_2$-$C_8$-alkylene group, or the two $R_1$ can form together an optionally substituted aliphatic 3 to 6 membered ring with the C or Si-atoms they are attached to and
$R_2$, $R_3$, $R_{3'}$, $R_4$, $R_{4'}$, $R_5$ and $R_{5'}$ are the same or different and can be hydrogen, a linear or branched $C_1$ to $C_8$-alkyl, or a $C_3$-$C_8$-alkylene group, wherein two or more of $R_2$, $R_3$, $R_{3'}$, $R_4$, $R_{4'}$, $R_5$ and $R_{5'}$ can form a ring, or any two neighoured $R_2$, $R_3$, $R_4$ and $R_5$ can represent a double bond, and optionally at least one of the ring C-atoms in the oxygen containing rings can be replaced by a heteroatom selected from O, N and P, More preferably the compound (C) of the present invention is of formula (IV)

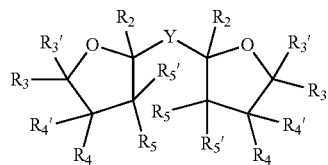

wherein
Y is selected from the group consisting of $C(R_1)_2$, $Si(R_1)_2$, $CHR_1$—$CHR_1$, $CR_1$=$CR_1$, $CHR_1$—$NR_1$ and $CR_1$=$N$, wherein each $R_1$ can be the same or different and can be hydrogen, a linear or branched $C_1$ to $C_8$-alkyl group, or a $C_2$-$C_8$-alkylene group, or the two $R_1$ can form together an optionally substituted aliphatic 3 to 6 membered ring with the C or Si-atoms they are attached to and
$R_2$, $R_3$, $R_{3'}$, $R_4$, $R_{4'}$, $R_5$ and $R_{5'}$ are the same or different and can be hydrogen, a linear or branched $C_1$ to $C_8$-alkyl, or a $C_3$-$C_8$-alkylene group, wherein two or more of $R_2$, $R_3$, $R_{3'}$, $R_4$, $R_{4'}$, $R_5$ and $R_{5'}$ can form a ring,
Preferably in formula (IV)
Y is $C(R_1)_2$ or $Si(R_1)_2$. more preferably Y is $C(R_1)_2$,
$R_1$ are the same and are a linear or branched $C_1$ to $C_5$-alkyl group, more preferably are the same and selected from the group consisting of $CH_3$, $CH_2CH_3$, and $CH_2CH_2CH_3$,
$R_2$, $R_3$, $R_{3'}$, $R_4$, $R_{4'}$, $R_5$ and $R_{5'}$ are the same or different and can be hydrogen, linear or branched $C_1$ to $C_5$-alkyl group, more preferably are H, $CH_3$ or $CH_2CH_3$, wherein the two oxygen-containing rings are tetrahydrofuran or tetrahydropyran.

Still more preferably the compound (C) is 2,2-di(2-tetrahydrofuryl)propane (DTHFP).

According to another embodiment of the present invention, the compound (M) or mixture (MI) comprising hydrocarbyl and/or hydrocarbyl oxide linked to magnesium has been prepared by contacting di-$C_1$-$C_{10}$ alkyl magnesium and a $C_1$-$C_{12}$ alcohol. It is preferred that the molar ratio of the di-$C_1$-$C_{10}$ alkyl magnesium to the $C_1$-$C_{12}$ alcohol is between 1:1.33 and 1:2.2.

It should be understood that for the purposes of the present invention, the following terms have the following meanings:

The term "solid catalyst component" or "procatalyst" refers to the solid supported catalyst component.

The term "catalyst" or "polymerization catalyst" or "catalyst system" refers to the active catalyst, which has been obtained by activating the solid catalyst component with the cocatalyst.

In the following the invention is described in more detail.
Inorganic Support (IS)

According to step (a) of the process for producing a procatalyst, an inorganic support (IS) is used.

The inorganic support (IS) used in the invention may be any suitable support, which has the proper chemical and physical properties to act as a support for the active component of the procatalyst. The support material preferably has a suitable average particle size and particle size distribution, a high porosity and a large specific surface area. Especially good results are obtained if the support material has a specific surface area of between 100 and 1,000 m²/g support and a pore volume of 1 to 3 ml/g support. The support material can optionally be chemically pre-treated, e. g. by silylation or by treatment with aluminium alkyls.

According to one embodiment of the invention, the inorganic support (IS) is an inorganic oxide. For example, the inorganic support (IS) is an inorganic mono-oxide or an inorganic mixed oxide of an element selected from Groups 3-6 and 13-14 of the Periodic Table of the Elements (IUPAC 1990), preferably an inorganic mono-oxide or an inorganic mixed oxide of silicon or aluminium. In one embodiment of the present invention, the inorganic support (IS) is silica.

The average particle size of the silica support can be typically from 7 to 100 μm, preferably 10 to 80 μm. However, it has turned out that special advantages can be obtained if the support has an average particle size from 10 to 30 μm, preferably 15 to 30 μm. Alternatively, the support may has an average particle size of from 30 to 80 μm, preferably from 30 to 50 μm. Further, in some applications silica support with very small particle size, like 7 to 15, preferably 8 to 12 μm, might be used.

According to one embodiment, the inorganic support (IS) is an inorganic mono-oxide or an inorganic mixed oxide having surface hydroxyl groups. For example, the inorganic support (IS) being an inorganic mono-oxide or an inorganic mixed oxide having surface hydroxyl groups is silica.

Usually, the inorganic support (IS) is dried before impregnating it with other catalyst components. Furthermore, the amount of hydroxyl groups, which appear on the surface of most inorganic oxides, may be reduced by heat-treatment and/or chemical treatment. Good results are e. g. achieved by treating the support with heat at 100 to 900° C., preferably 400 to 800° C., for a sufficient time to reduce the hydroxyl groups on the surface to a lower level. Preferably, the treated inorganic support (IS) contains at most 2.0 mmol and more preferably at most 1.0 mmol of hydroxyl groups/g of support.

The inorganic support (IS) may further contain additional compounds. Especially useful is a silica support material comprising magnesium halide in such an amount that the support contains 1 to 20%, preferably 1 to 10%, more preferably 2 to 6% by weight magnesium, as disclosed in WO 99/51646.

Alkyl Metal Chloride (AMC)

According to step (b) of the process for producing a procatalyst, an alkyl metal chloride (AMC) is used.

It is appreciated that the alkyl metal chloride (AMC) both chlorinates the surface of the support and partly acts as a cocatalyst precursor. However, the alkyl metal chloride (AMC) is not intended as a cocatalyst, but the catalyst system presupposes large amounts of a separate cocatalyst, see below.

The alkyl metal chloride (AMC) should be a metal compound containing chlorine that is soluble in non-polar hydrocarbon solvents. The compound is thus an alkyl metal chloride (AMC) of formula (I)

$$R_n MeCl_{3-n} \quad (I)$$ 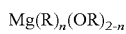

wherein R is a $C_1$-$C_{20}$ alkyl group, Me is a metal of group 13 of the Periodic Table, and n is 1 or 2.

It is appreciated that the alkyl group R can be linear, branched or cyclic, or a mixture of such groups. In one embodiment of the present invention, R is a $C_1$-$C_{20}$ alkyl, preferably a $C_1$-$C_{10}$ alkyl, more preferably a $C_2$-$C_6$ alkyl and most preferably a $C_2$-$C_4$ alkyl. For example, R is a linear $C_1$-$C_{20}$ alkyl, preferably a linear $C_1$-$C_{10}$ alkyl, more preferably a linear $C_2$-$C_6$ alkyl and most preferably a linear $C_2$-$C_4$ alkyl.

In one embodiment of the present invention, the Me of the alkyl metal chloride (AMC) is a metal of group 13 of the Periodic Table such as boron, aluminum or gallium. For example, the Me of the alkyl metal chloride (AMC) being a metal of group 13 of the Periodic Table is aluminum.

In one embodiment of the present invention, the alkyl metal chloride (AMC) is an alkyl aluminum chloride, preferably a lower alkyl aluminum dichloride. For example, the alkyl metal chloride (AMC) is ethyl aluminum dichloride.

A combination of different alkyl metal chlorides (AMC) can also be used.

It is recommendable to contact the alkyl metal chloride (AMC) directly or indirectly with the inorganic support (IS) in the form of a solution, which penetrates the pores of the inorganic support (IS) and reacts with as many of the surface groups or earlier deposited reagent molecules as possible.

Thus, according to one embodiment, said alkyl metal chloride (AMC) may be contacted with said inorganic support (IS) such that the alkyl metal chloride (AMC) is in hydrocarbon solution, preferably in a 5 to 30 wt.-%, like in a 10 to 25 wt.-%, hydrocarbon solution, the viscosity of which most preferably is below 10 mPa s at room temperature. Suitable solvents are $C_1$ to $C_{10}$ aliphatic, cyclic or aromatic $C_6$ to $C_{12}$ hydrocarbons, like $C_1$ to $C_8$ alkanes and/or aromatic hydrocarbons, especially $C_5$ to $C_8$ alkanes such as pentane, hexane and heptane or toluene. In one specific example heptane as solvent is used. Accordingly in one specific embodiment a 20 to 30 wt.-%, like 23 to 27 wt.-%, e.g. 25 wt.-%, heptane solution of an alkyl metal chloride (AMC), especially of ethyl aluminum dichloride, is used.

When contacting the alkyl metal chloride (AMC) with an inorganic support (IS) having surface hydroxyl groups, such as silica, the molar ratio between the alkyl metal chloride (AMC) and the surface hydroxyls of the inorganic support is preferably between 1 and 4 and most preferably between 1 and 3. The preferred contacting temperature is between 0 and 110° C., preferably between 10 and 70° C. and most preferably between 20 and 50° C.

Compound (M) or Mixture (MI)

According to step (c), i.e. according to one of the steps (c1) to (c4) of the process for producing a procatalyst, a compound (M) or mixture (MI) comprising hydrocarbyl and/or hydrocarbyl oxide linked to magnesium is used.

Preferably the compound (M) linked to magnesium is of formula (II)

$$Mg(R)_n(OR)_{2-n}$$ 

where n is 0, 1 or 2,
each R can be the same or different hydrocarbyl group of 1 to 20 C atoms.

The mixture (MI) may comprise different compounds of formula (II).

Accordingly, the compound (M) or mixture (MI) comprising hydrocarbyl and/or hydrocarbyl oxide linked to magnesium used in one of the steps (c1) to (c4) may be any suitable mixture comprising one or more magnesium compound(s), preferably one or more magnesium compound(s) of formula (II). Thus, it may be a magnesium di($C_1$-$C_{20}$) alkyl, such as di($C_2$-$C_{10}$)alkyl, like butyl-octyl-magnesium, butyl-ethyl magnesium, diethyl magnesium or dibutyl magnesium.

In one embodiment of the present invention, the compound (M) is a magnesium dialkoxy compound. For example, the compound (M) has a general formula $Mg(OR)_2$, wherein R is independently a $C_2$-$C_{16}$ alkyl, preferably $C_4$-$C_{12}$ alkyl.

One of the purposes of the invention is to obtain a high activity procatalyst despite high hydrogen concentrations in polymerization. Then the magnesium component of the procatalyst may have both Mg—C bonds and Mg—O—C bonds. These bonds may be in the same compound (M) such as RMgOR, or in different compound (M). Thus mixtures (MI) of $R_2Mg$ and $Mg(OR)_2$ are within the scope of the invention, as well as mixtures of $R_2Mg$ and RMgOR and mixtures of RMgOR and $Mg(OR)_2$. Preferably, the compound (M) or mixture (MI) comprising hydrocarbyl and hydrocarbyl oxide linked to magnesium is hydrocarbon soluble, which gives a solution capable of effectively penetrating the voids and pores of the support.

According to one embodiment of the present invention, said compound (M) or mixture (MI) comprising hydrocarbyl and hydrocarbyl oxide linked to magnesium is a contact product of a di-$C_1$-$C_{10}$ alkyl magnesium and a $C_1$-$C_{12}$ alcohol, i.e. the compound (M) or mixture (MI) comprising hydrocarbyl and hydrocarbyl oxide linked to magnesium is prepared by contacting di-$C_1$-$C_{10}$ alkyl magnesium and a $C_1$-$C_{12}$ alcohol.

Preferably, the di-$C_1$-$C_{10}$ alkyl magnesium is dibutyl magnesium, butyl ethyl magnesium, diethyl magnesium or butyl octyl magnesium. For example, the di-$C_1$-$C_{10}$ alkyl magnesium is butyl octyl magnesium. Preferably, the $C_1$-$C_{12}$ alcohol is a branched alcohol, preferably a 2-alkyl alkanol, most preferably 2-ethyl-1-hexanol or 2-methyl-1-pentanol. For example, the $C_1$-$C_{12}$ alcohol is 2-ethyl-1-hexanol.

In one embodiment of the present invention, the di-$C_1$-$C_{10}$ alkyl magnesium is butyl octyl magnesium and the $C_1$-$C_{12}$ alcohol is 2-ethyl-1-hexanol.

When the compound (M) or mixture (MI) comprising hydrocarbyl and hydrocarbyl oxide linked to magnesium is a contact product of a di-$C_1$-$C_{10}$ alkyl magnesium and a $C_1$-$C_{12}$ alcohol, the corresponding molar ratio of di-$C_1$-$C_{10}$ alkyl magnesium to $C_1$-$C_{12}$ alcohol is preferably 1:1.3 to 1:2.2 and more preferably 1:1.78 to 1:1.99. For example, the molar ratio of di-$C_1$-$C_{10}$ alkyl magnesium to $C_1$-$C_{12}$ alcohol is 1:1.80 to 1:1.98.

The compound (M) or mixture (MI) comprising hydrocarbyl and hydrocarbyl oxide linked to magnesium is preferably in a nonpolar hydrocarbon solution, most preferably in a nonpolar hydrocarbon solution the viscosity of which is below 10 mPa·s at room temperature. The viscosity can be advantageously reduced by adding an alkyl metal chloride (AMC) to the solution. The alkyl metal chloride (AMC) preferably has the formula (I). However in the present case it is not preferred that the alkyl metal chloride (AMC) is used to adapt the viscosity of the compound (M) or mixture (MI). The reduced viscosity allows a thorough penetration of the compound (M) or mixture (MI) into the voids and pores of the inorganic support (IS) is attained. This improves the morphology of the procatalyst and thus the morphology of the ethylene copolymers prepared by it, as well.

When contacting the compound (M) or mixture (MI) comprising hydrocarbyl and hydrocarbyl oxide linked to magnesium, good deposition on the surface of the inorganic support (IS) is obtained if the volume of solution comprising the compound (M) or mixture (MI) comprising hydrocarbyl and hydrocarbyl oxide linked to magnesium is about two times the pore volume of the support material. This is achieved if the concentration of the complex in the hydrocarbon solvent is 5 to 60% with respect to the hydrocarbon used as solvent. The solvent may be a $C_1$-$C_8$ alkane and/or an aromatic $C_6$-$C_{12}$ hydrocarbon, e. g. a mixture of a major amount of pentane, hexane or heptane and a minor amount of e. g. toluene.

Titanium Compound (TC)

Further in the instant process for producing a procatalyst, a titanium compound (TC) is used.

One of the main catalyst components is the titanium compound (TC), which is assumed to form the active centre during the polymerization of $C_2$-$C_{12}$ olefins.

It is appreciated that the titanium compound (TC) is of formula (III)

$$(OR')_{4-x}TiCl_x \qquad (III)$$

wherein R' is a $C_2$-$C_{20}$ hydrocarbyl group and x is an integer of 3 or 4.

It is appreciated that the hydrocarbyl group R' can be linear, branched or cyclic, or a mixture of such groups. In one embodiment of the present invention, R' is a $C_2$-$C_{20}$ hydrocarbyl, preferably a $C_2$-$C_{10}$ hydrocarbyl, more preferably a $C_2$-$C_6$ hydrocarbyl and most preferably a $C_2$-$C_4$ hydrocarbyl. For example, R' is a linear $C_2$-$C_{20}$ hydrocarbyl, preferably a linear $C_2$-$C_{10}$ hydrocarbyl, more preferably a linear $C_2$-$C_6$ hydrocarbyl and most preferably a linear $C_2$-$C_4$ hydrocarbyl. In one embodiment of the present invention, R' is ethyl.

The titanium compound (TC) is preferably a chlorinated alcoholate, i.e. $TiCl_3.OR'$, or a solely chloride containing compound such as $TiCl_4$. It is thus appreciated that x is preferably an integer of 3 or 4. In one embodiment of the present invention, x is 4. It is thus preferred that the most preferable titanium compound (TC) is titanium tetrachloride.

Electron Donor Compound (ED)

One further essential component in the present invention is the electron donor compound (ED). According to the present invention the electron donor compound (ED) is a compound (C) comprising two oxygen containing rings, wherein said two rings are linked via a bridge selected from the group consisting of carbon bridge, silicon bridge, ethane-1,2-diylbridge, ethene-1,2-diylbridge, alkylaminomethyl bridge and imine bridge.

Preferably the two oxygen containing rings are the same rings. The term "the same" indicates that the two oxygen containing rings have the same ring structure. However each ring may contain different residues linked to it.

The term "carbon bridge" indicates that the two oxygen containing rings are linked via one carbon atom moiety. This carbon atom moiety may be substituted. Thus the carbon bridge can be for instance $CH_2$, $CHR_1$ or $C(R_1)_2$, wherein $R_1$ is preferably a linear or branched $C_1$ to $C_8$-alkyl group, or a linear or branched $C_2$-$C_8$-alkylene group, more preferably the carbon bridge is $C(R_1)_2$, wherein both $R_1$ are the same and a linear or branched $C_1$ to $C_8$-alkyl group, like a linear or branched $C_1$ to $C_5$-alkyl group, especially methyl, ethyl or propyl.

The term "silicon bridge" indicates that the two oxygen containing rings are linked via one silicon atom moiety. This silicon atom moiety may be substituted. Thus the silicon bridge can be for instance $SiH_2$, $SiHR_1$ or $Si(R_1)_2$, wherein $R_1$ is preferably a linear or branched $C_1$ to $C_8$-alkyl group, or a linear or branched $C_2$-$C_8$-alkylene group, more preferably the carbon bridge is $Si(R_1)_2$, wherein both $R_1$ are the same and a linear or branched $C_1$ to $C_8$-alkyl group, like a linear or branched $C_1$ to $C_5$-alkyl group, especially methyl, ethyl or propyl.

In both "carbon bridge" and "silicon bridge" the $R_1$ groups can form a ring with the carbon or silicon atom they are attached to.

The term "ethane-1,2-diyl bridge" indicates that the two oxygen containing rings are linked preferably via one $C(R_1)_2$—$C(R_1)_2$, moiety, wherein $R_1$ can be any organic residue, preferably a residue as defined in this paragraph. Thus the ethane-1,2-diyl bridge can be for instance $CHR_1$—$CHR_1$, $CHR_1$—$C(R_1)_2$, or $C(R_1)_2$—$C(R_1)_2$, wherein both $R_1$ can be the same or different, preferably the same, and $R_1$ is preferably a linear or branched $C_1$ to $C_8$-alkyl group, or a linear or branched $C_2$-$C_8$-alkylene group, wherein further both $R_1$ may form a saturated or an unsaturated, like an aromatic, ring. More preferably the ethane-1,2-diyl bridge is $CHR_1$—$CHR_1$, wherein both $R_1$ are the same and a linear or branched $C_1$ to $C_8$-alkyl group, like a linear $C_1$ to $C_5$-alkyl group.

The term "aromatic ring" in the previous paragraph includes benzene, polycyclic aromatics and heterocyclic aromatics such as furan, pyrrole and thiophene The term "ethene-1,2-diyl bridge" indicates that the two oxygen containing rings are linked preferably via one CR₁═CR₁ moiety, wherein R₁ can be any organic residue, preferably a residue as defined in this paragraph. Thus the ethene-1,2-diyl bridge can be for instance CH═CH, CH═CR₁, or CR₁═CR₁, wherein both R₁ can be the same or different, preferably the same, and R₁ is preferably a linear or branched C₁ to C₈-alkyl group, or a linear or branched C₂-C₈-alkylene group, wherein further both R₁ may form a saturated or an unsaturated, like an aromatic, ring. More preferably the ethene-1,2-diyl bridge is CR₁═CR₁, wherein both R₁ are the same and a linear or branched C₁ to C₈-alkyl group, like a linear C₁ to C₅-alkyl group.

The term "alkylaminomethyl bridge" indicates that the two oxygen containing rings are linked preferably via one C(R₁)₂—NR₁ moiety, wherein R₁ can be any organic residue, preferably a residue as defined in this paragraph. Thus the alkylaminomethyl bridge can be for instance CH₂—NR₁, CHR₁—NR₁, or C(R₁)₂—NR₁, wherein both R₁ can be the same or different, preferably the same, and R₁ is preferably a linear or branched C₁ to C₈-alkyl group, or a linear or branched C₂-C₈-alkylene group, wherein further one R₁ linked to C and the R₁ linked to N may form a saturated or an unsaturated, like an aromatic, ring. More preferably the alkylaminomethyl bridge is CHR₁—NR₁, wherein both R₁ are the same and a linear or branched C₁ to C₈-alkyl group, like a linear C₁ to C₅-alkyl group.

The term "imine bridge" indicates that the two oxygen containing rings are linked preferably via one CR₁═N moiety, wherein R₁ can be any organic residue, preferably a residue as defined in this paragraph. Thus the imine bridge can be for instance CH═N or CR₁═N, wherein R₁ is preferably a linear or branched C₁ to C₈-alkyl group, or a linear or branched C₂-C₈-alkylene group. More preferably the imine bridge is CR₁═N. wherein R₁ is a linear or branched C₁ to C₈-alkyl group, like a linear C₁ to C₅-alkyl group.

Preferably the two oxygen-containing rings are individually 4, 5, 6, or 7 member rings, preferably both oxygen-containing rings are 4, 5, 6, or 7 membered. In one preferred embodiment the two oxygen-containing rings are both 5 member rings. In another preferred embodiment the two oxygen-containing rings are both 6 member rings The two oxygen-containing rings can be individually saturated or unsaturated. Preferably both oxygen-containing rings are either saturated or unsaturated, preferably both oxygen-containing rings are saturated.

Further the two oxygen containing rings may comprise additionally to the oxygen atom required 1 to 3 further heteroatoms from among O, N and P, preferably from among O and N. Preferably the two oxygen containing rings comprise only the required O as heteroatom.

Thus examples for preferred saturated oxygen-containing rings are:

 

(tetrahydrofuran) and (tetrahydropyran).

Examples for preferred unsaturated oxygen-containing rings are:

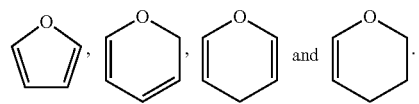

More preferably the compound (C) comprises two identical oxygen containing ring structures as defined above.

More preferably the compound (C) of the present invention is of formula (IV)

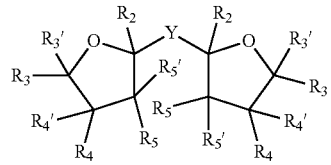

wherein

Y is selected from the group consisting of C(R₁)₂, CHR₁—CHR₁, CR₁═CR₁, CHR₁—NR₁ and CR₁═N, wherein each R₁ can be the same or different and can be hydrogen, a linear or branched C₁ to C₈-alkyl group, or a C₂-C₈-alkylene group, or the two R₁ can form together an optionally substituted aliphatic 3 to 6 membered ring with the C or Si-atoms they are attached to and R₂, R₃, R₃', R₄, R₄', R₅ and R₅' are the same or different and can be hydrogen, a linear or branched C₁ to C₈-alkyl, or a C₃-C₈-alkylene group, wherein two or more of R₂, R₃, R₃', R₄, R₄', R₅ and R₅' can form a ring, or any two neighoured R₂, R₃, R₄ and R₅ can represent a double bond, and optionally at least one of the ring C-atoms in the oxygen containing rings can be replaced by a heteroatom selected from O, N and P, Preferably the oxygen containing rings do not contain any additional heteroatoms.

Accordingly, it s especially preferred that the compound (C) of the present invention is of formula (IV)

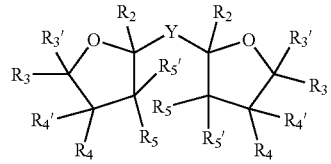

wherein

Y is selected from the group consisting of C(R₁)₂, Si(R₁)₂, CHR₁—CHR₁, CR₁═CR₁, CHR₁—NR₁ and CR₁═N, wherein each R₁ can be the same or different and can be hydrogen, a linear or branched C₁ to C₈-alkyl group, or a C₂-C₈-alkylene group, or the two R₁ can form together an optionally substituted aliphatic 3 to 6 membered ring with the C or Si-atoms they are attached to and R₂, R₃, R₃', R₄, R₄', R₅ and R₅' are the same or different and can be hydrogen, a linear or branched C₁ to C₈-alkyl, or a C₃-C₈-alkylene group, wherein two or more of R₂, R₃, R₃', R₄, R₄', R₅ and R₅' can form a ring, These compounds are known for example from EP 2495266 A1 or WO-2011157742 as randomizer/polar agent in the preparation of high styrene high vinyl solution-based styrene-butadiene rubber or from EP 183538 A1as a reactive diluent in epoxy resins.

In case Y comprises two $R_1$ it is preferred that they are the same.

Examples for linear or branched $C_1$ to $C_8$-alkyl groups are methyl, ethyl, n-propyl, i-propyl, n-butyl, sec.-butyl, tert.-butyl, pentyls, hexyl, and the like.

Examples for $C_2$-$C_8$-alkylene groups are pentylene, butylenes and the like.

In the formula (IV) Y is preferably $C(R_1)_2$ or $Si(R_1)_2$, most preferably $C(R_1)_2$.

As mentioned above, two or more of $R_2$, $R_3$, $R_{3'}$, $R_4$, $R_{4'}$, $R_5$ and $R_{5'}$ can also form a ring. If one or more rings are formed by the residues $R_2$, $R_3$, $R_{3'}$, $R_4$, $R_{4'}$, $R_5$ and $R_{5'}$, these are preferably formed by $R_3$ and $R_4$ and/or $R_4$ and $R_5$.

Preferably the residues $R_2$, $R_3$, $R_{3'}$, $R_4$, $R_{4'}$, $R_5$ and $R_{5'}$ do not form rings.

The two $R_1$ are preferably the same and can be a linear $C_1$ to $C_4$-alkyl, more preferably methyl or ethyl and most preferably both $R_1$ are methyl.

$R_2$, $R_3$, $R_{3'}$, $R_4$, $R_{4'}$, $R_5$ and $R_{5'}$ are preferably the same or different and can be H, methyl or ethyl, more preferably only up to four of the residues $R_2$, $R_3$, $R_{3'}$, $R_4$, $R_{4'}$, $R_5$ and $R_{5'}$ are a methyl, the others are H and most preferably $R_2$, $R_3$, $R_{3'}$, $R_4$, $R_{4'}$, $R_5$ and $R_{5'}$ are all H.

For both oxygen-containing rings n is preferably the same and is 0, 1 or 2, preferably 1 or 2 and more preferably 1.

In one preferred embodiment the compound (C) is of formula (IV)

wherein

Y is $C(R_1)_2$, $R_1$ are the same and are a linear $C_1$ to $C_4$-alkyl group, and $R_2$, $R_3$, $R_{3'}$, $R_4$, $R_{4'}$, $R_5$ and $R_{5'}$ are the same or different and can be hydrogen (H), methyl ($CH_3$) or ethyl ($CH_2CH_3$), whereby the two oxygen-containing rings are tetrahydrofuran or tetrahydropyran, preferably tetrahydrofuran.

In one specific embodiment the compound (C) is of formula (IV) wherein

Y is $C(CH_3)_2$ or $C(CH_2CH_3)_2$, preferably $C(CH_3)_2$, and $R_2$, $R_3$, $R_{3'}$, $R_4$, $R_{4'}$, $R_5$ and $R_{5'}$ are hydrogen (H), whereby the two oxygen-containing rings are tetrahydrofuran or tetrahydropyran, preferably tetrahydrofuran.

Accordingly, specific examples of suitable compounds (C) are 2,2-di(2-tetrahydrofuryl)propane, 2,2-di(2-tetrahydropyranyl)propane, 2,2-di(2-(3,4-dihydro-2H-pyranyl)) propane, 2,2-di(2-pyranyl)propane, 2,2-di(2-furan)propane, as well as their analogous alkane compounds, like butane, hexane e.t.c. Most preferably compounds (C) is 2,2-di(2-tetrahydrofuryl)propane (DTHFP).

Isomer mixtures of the above described donors can also be used.

Preferred Amounts of Compounds

The amount of inorganic support (IS), alkyl metal chloride (AMC), compound (M) or mixture (MI) comprising hydrocarbyl and/or hydrocarbyl oxide linked to magnesium and titanium compound (TC) used in the process for producing a procatalyst can be varied and optimized in a wide range in order to obtain the best results possible. However, the following amounts are preferred.

In the process for producing a procatalyst, the molar ratio between said titanium compound (TC) to said alkyl metal chloride (AMC) measured as molTi/mol Al is preferably in the range from 0.1 to 5, preferably 0.1 to 3.0, more preferably 0.1 to 2.0, most preferably 0.2 to 1.5, especially 0.2 to 1.0.

The amount of said alkyl metal chloride (AMC) relative to the mass of the inorganic support (IS), measured as mmol Al/g support, is preferably 0.1 to 30 mmol/g, more preferably 0.5 to 10.0 mmol/g, and most preferably 1.0 to 5.0 mmol/g support.

The amount of said compound (M) or mixture (MI) comprising hydrocarbyl and/or hydrocarbyl oxide linked to magnesium relative to said alkyl metal chloride (AMC), expressed as mol Mg/mol Al, is preferably 0.1 to 5.0, more preferably 0.1 to 2.0 and in particular 0.5 to 1.5.

It is especially preferred that the amount of said electron donor compound (ED) relative to said compound (M) or mixture (MI) comprising hydrocarbyl and/or hydrocarbyl oxide linked to magnesium, expressed as mol ED/mol Mg, is preferably 0.01 to below 0.40, more preferably 0.05 to 0.35 and in particular 0.10 to 0.30, like 0.15 to 0.28. One suitable mol ratio range is between 0.20 to 0.25.

The amount of said electron donor compound (ED) to said titanium compound (TC), expressed as mol ED/mol Ti, is preferably of from 0.01 to 10.0, more preferably of from 0.02 to 5.0 and in particular of from 0.05 to 3.0.

Producing Method of Procatalyst

Beside the specific selection of electron donor compound (ED) also the order of the steps used for the manufacture of the procatalyst according to this invention is of essential importance. Accordingly it is preferred that the electron donor compound (ED) is added to the inorganic support (IS) after the addition of the alkyl metal chloride (AMC). In other words the inorganic support (IS) is first contacted (treated) with the alkyl metal chloride (AMC) obtaining thereby a first reaction product ($1^{st}$ RP) and subsequently said first reaction product ($1^{st}$ RP) is contacted (treated) with the electron donor compound (ED) obtaining thereby a second reaction product ($2^{nd}$ RP).

After this contacting order (treatment order) a contacting of the compound (M) or mixture (MI) and titanium compound (TC), respectively, follows. Thus the second reaction product ($2^{nd}$ RP) can be contacted (treated) as follows:

(c1) contacting said second reaction product ($2^{nd}$ RP) with the compound (M) or mixture (MI) obtaining a third reaction product ($3^{rd}$ RPa) and subsequently contacting said third reaction product ($3^{rd}$ RPa) with the titanium compound (TC) obtaining the procatalyst, or (c2) contacting said second reaction product ($2^{nd}$ RP) with the titanium compound (TC) obtaining a third reaction product ($3^{rd}$ RPb) and subsequently contacting said third reaction product ($3^{rd}$ RPb) with the compound (M) or mixture (MI) obtaining the procatalyst, or (c3) contacting said second reaction product ($2^{nd}$ RP) simultaneously with the compound (M) and the titanium compound (TC) or with the mixture (MI) and the titanium compound (TC) obtaining the procatalyst, or (c4) contacting said second reaction product ($2^{nd}$ RP) with the mixture of compound (M) and the titanium compound (TC) or with the mixture of a mixture (MI) and the titanium compound (TC) obtaining the procatalyst, Preferably step (c1) is used. Thus in one specific embodiment the procatalyst is produced by the steps in the order of:

(a) contacting an inorganic support (IS) with an alkyl metal chloride (AMC) obtaining a first reaction product ($1^{st}$ RP), (b) contacting said first reaction product ($1^{st}$ RP) with an electron donor compound (ED) obtaining a second reaction product ($2^{nd}$ RP), (c1) contacting said second reaction product ($2^{nd}$ RP) with a compound (M) or mixture (MI) obtaining a third reaction product ($3^{rd}$ RPa) and subsequently contacting said third reaction product (3$^{rd}$ RPa) with a titanium compound (TC) obtaining the procatalyst.

Steps (c3) and (c4) differ from each other insofar that in step (c4) the titanium compound (TC) is first mixed either with compound (M) or with the mixture (MI) and subsequently said produced mixture is contacted with the second reaction product (2$^{nd}$ RP) whereas in step (c3) no premixing is accomplished but both, the titanium compound (TC) and the compound (M) or the titanium compound (TC) and the mixture (MI), are contacted simultaneously with the second reaction product (2$^{nd}$ RP). In other words in step (c3) the titanium compound (TC) and the compound (M) or the titanium compound (TC) and the mixture (MI) are added at the same time to the second reaction product (2$^{nd}$ RP).

Preferably, all the steps (a) to (c), i.e. (c1) to (c4), of contacting the components are conducted either in a hydrocarbon solvent, which does not contain any heteroatoms, such as oxygen, nitrogen, sulphur or halogen, or without any additional solvent.

More preferably, the solvent is a low-boiling compound containing from five to eight carbon atoms, which easily can be removed from the solid catalyst component. Such compounds are, among others, pentanes, hexanes, heptanes, octanes, cyclopentanes, cyclohexanes, cycloheptanes and some aromatic compounds, such as toluene. Especially preferred solvents are n-pentane or n-hexane or n-heptane. For example, the solvent is n-pentane or n-heptane.

Typically the temperature in step (a) at said contacting is 5 to 80° C., preferably 10 to 60° C., more preferably 20 to 55° C., like 25 to 50° C. Preferably the contacting time in step (a) is between 30 to 150 min, more preferably between 40 to 120 min, like 50 to 90 min.

Typically the temperature in step (b) at said contacting is 5 to 80° C., preferably 10 to 60° C., more preferably 20 to 55° C., like 25 to 50° C. Preferably the contacting time in step (a) is between 30 to 150 min, more preferably between 40 to 120 min, like 50 to 90 min.

Typically the temperature at contacting said 2$^{nd}$ reaction product (2$^{nd}$ RP) with the compound (M) or the mixture (MI) obtaining the third reaction product (3$^{rd}$ RPb) is 5 to 80° C., preferably 10 to 70° C., more preferably 20 to 60° C., like 25 to 50° C. Preferably the contacting time is between 30 to 180 min, more preferably between 50 to 120 min, like 60 to 100 min. Subsequently said third reaction product (3$^{rd}$ RPb) is contacted with the titanium compound (TC) preferably at 10 to 80° C., more preferably 30 to 70° C., like 35 to 60° C. Preferably the contacting time is between 30 to 120 min, more preferably between 40 to 90 min, like 50 to 70 min.

In case the 2$^{nd}$ reaction product (2$^{nd}$ RP) is first contacted with the titanium compound (TC) and subsequently with the compound (M) or the mixture (MI) the conditions are preferably as follows. The temperature at contacting said 2$^{nd}$ reaction product (2$^{nd}$ RP) with the titanium compound (TC) obtaining the third reaction product (3$^{rd}$ RPb) is 5 to 80° C., preferably 10 to 70° C., more preferably 20 to 60° C., like 25 to 50° C. Preferably the contacting time is between 30 to 120 min, more preferably between 40 to 90 min, like 50 to 70 min. Subsequently said third reaction product (3$^{rd}$ RPb) is contacted with the compound (M) or the mixture (MI) preferably at 10 to 80° C., more preferably 30 to 70° C., like 35 to 60° C. Preferably the contacting time is between 30 to 120 min, more preferably between 40 to 90 min, like 50 to 70 min.

In case of steps (c3) or (c4) the conditions are preferably as follows. In case the 2$^{nd}$ reaction product (2$^{nd}$ RP) is simultaneously contacted with the compound (M) and the titanium compound (TC) (step (c3) first alternative) or with the mixture (MI) and the titanium compound (TC) (step (c3) second alternative) or with a mixture of compound (M) and titanium compound (TC) (step (c4) first alternative) or with a mixture of mixture (MI) and titanium compound (TC) (step (c4) second alternative) the contacting temperature is 5 to 80° C., preferably 10 to 70° C., more preferably 20 to 60° C., like 25 to 50° C. Preferably the contacting time in step (c3) or (c4) is between 30 to 120 min, more preferably between 40 to 90 min, like 50 to 70 min.

The obtained procatalyst may be washed after any state of the synthesis, using methods known in the art, such as filtering or decanting. Inert hydrocarbons, such as pentane, hexane or heptane, may be used as wash liquids.

Procatalyst

In accordance with the compounds described above, the procatalyst of the present invention comprises
(a) an inorganic support (IS),
(b) a chlorine compound carried on said support,
(c) a magnesium compound carried on said support,
(d) a titanium compound carried on said support, and
(e) an electron donor compound (ED) being a compound (C) comprising two oxygen containing rings, wherein said two rings are linked via a bridge selected from the group consisting of carbon bridge, silicon bridge, ethane-1,2-diyl bridge, ethene-1,2-diylbridge, alkylaminomethyl bridge and imine bridge.

Preferably the compound (C) is of formula (IV)

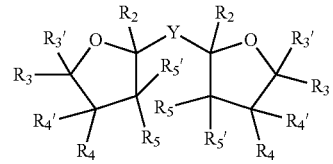

wherein
Y is selected from the group consisting of C(R$_1$)$_2$, Si(R$_1$)$_2$, CHR$_1$—CHR$_1$, CR$_1$=CR$_1$, NR$_1$ and CR$_1$=N, wherein each R$_1$ can be the same or different and can be hydrogen, a linear or branched C$_1$ to C$_8$-alkyl group, or a C$_2$-C$_8$-alkylene group, or the two R$_1$ can form together an optionally substituted aliphatic 3 to 6 membered ring with the C or Si-atoms they are attached to and R$_2$, R$_3$, R$_3'$, R$_4$, R$_{4'}$, R$_5$ and R$_{5'}$ are the same or different and can be hydrogen, a linear or branched C$_1$ to C$_8$-alkyl, or a C$_3$-C$_8$-alkylene group, wherein two or more of R$_2$, R$_3$, R$_{3'}$, R$_4$, R$_{4'}$, R$_5$ and R$_{5'}$ can form a ring, or any two neighoured R$_2$, R$_3$, R$_4$ and R$_5$ can represent a double bond, and optionally at least one of the ring C-atoms in the oxygen containing rings can be replaced by a heteroatom selected from O, N and P, Preferably the oxygen containing rings do not contain any additional heteroatoms.

Accordingly, it is especially preferred that the compound (C) is of formula (IV)

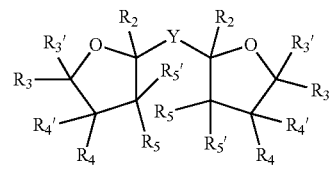

wherein

Y is selected from the group consisting of $C(R_1)_2$, $Si(R_1)_2$, $CHR_1—CHR_1$, $CR_1=CR_1$, $CHR_1—NR_1$ and $CR_1=N$, wherein each $R_1$ can be the same or different and can be hydrogen, a linear or branched $C_1$ to $C_8$-alkyl group, or a $C_2$-$C_8$-alkylene group, or the two $R_1$ can form together an optionally substituted aliphatic 3 to 6 membered ring with the C or Si-atoms they are attached to and $R_2$, $R_3$, $R_{3'}$, $R_4$, $R_{4'}$, $R_5$ and $R_{5'}$ are the same or different and can be hydrogen, a linear or branched $C_1$ to $C_8$-alkyl, or a $C_3$-$C_8$-alkylene group, wherein two or more of $R_2$, $R_3$, $R_{3'}$, $R_4$, $R_{4'}$, $R_5$ and $R_{5'}$ can form a ring, Concerning preferred embodiments of compound (C) reference is made to the information provided above under section "Electron donor compound (ED)". Thus in one preferred embodiment the compound (C) is 2,2-di(2-tetrahydrofuryl)propane (DTHFP).

With regard to the definition of the inorganic support (IS) and preferred embodiments thereof, reference is made to the section "Inorganic support (IS)".

The chlorine compound carried on said support (IS), the magnesium compound carried on said support (IS), the titanium compound carried on said support (IS), are the preferably the reaction products of the alkyl metal chloride (AMC), the compound (M) (or mixture (MI)) and the titanium compound (TC), respectively. Thus reference is also made for these components to the sections "Alkyl metal chloride (AMC)", "Compound (M) or mixture (MI)" "Titanium compound (TC)", "Preferred amounts of compounds" and "Producing method of procatalyst".

The procatalyst of the present invention is preferably produced by the process for producing a procatalyst as described above.

Accordingly in one preferred embodiment the procatalyst of the present invention comprising the inorganic support (IS), the chlorine compound carried on said support (IS), the magnesium compound carried on said support (IS), the a titanium compound carried on said support (IS), and the electron donor compound (ED) being a compound (C), preferably a compound (C) of formula (IV) as defined above, is obtained by the process comprising the steps in the order of:

(a) contacting the inorganic support (IS) with an alkyl metal chloride (AMC) obtaining a first reaction product ($1^{st}$ RP), (b) contacting said first reaction product ($1^{st}$ RP) with an electron donor compound (ED) obtaining a second reaction product ($2^{nd}$ RP), and (c1) contacting said second reaction product ($2^{nd}$ RP) with a compound (M) or mixture (MI) obtaining a third reaction product ($3^{rd}$ RPa) and subsequently contacting said third reaction product ($3^{rd}$ RPa) with a titanium compound (TC) obtaining the procatalyst, or (c2) contacting said second reaction product ($2^{nd}$ RP) with a titanium compound (TC) obtaining a third reaction product ($3^{rd}$ RPb) and subsequently contacting said third reaction product ($3^{rd}$ RPb) with a compound (M) or mixture (MI) obtaining the procatalyst, or (c3) contacting said second reaction product ($2^{nd}$ RP) simultaneously with a compound (M) and a titanium compound (TC) or with a mixture (MI) and a titanium compound (TC) obtaining the procatalyst, or (c4) contacting said second reaction product ($2^{nd}$ RP) with a mixture of compound (M) and a titanium compound (TC) or with a mixture of a mixture (MI) and a titanium compound (TC) obtaining the procatalyst, wherein (i) the alkyl metal chloride (AMC) is of formula (I)

$$R_n MeCl_{3-n} \quad (I)$$

wherein

R is a $C_1$-$C_{20}$ alkyl group,

Me is a metal of group 13 of the Periodic Table, and n is 1 or 2, (ii) the compound (M) and the mixture (MI) comprise a hydrocarbyl and/or hydrocarbyl oxide linked to magnesium, (iii) the titanium compound (TC) is of formula (III)

$$(OR')_{4-x} TiCl_x \quad (III)$$

wherein

R' is a $C_2$-$C_{20}$ hydrocarbyl group and x is an integer of 3 or 4, and (iv) the electron donor compound (ED) is a compound (C) comprising two oxygen containing rings, wherein said two rings are linked via a bridge selected from the group consisting of carbon bridge, silicon bridge, ethane-1,2-diyl bridge, ethene-1,2-diyl bridge, alkylaminomethyl bridge and imine bridge.

Preferably the compound (C) is of formula (IV) as defined in detail above. Further it is preferred that step (c1) is used.

With preferred embodiments of the process reference is made to the information provided above.

Catalyst

The above described procatalyst is combined with an activating cocatalyst so that it can be used in a polymerization process.

The activating cocatalyst is preferably an organometallic compound of formula (V)

$$R''_{3-n} AlX_n \quad (V)$$

wherein R'' is a $C_1$ to $C_{20}$ alkyl and X is halogen, preferably Cl, and n is 0, 1 or 2.

It is appreciated that the alkyl group R'' can be linear, branched or cyclic, or a mixture of such groups. In one embodiment of the present invention, R'' is a $C_1$-$C_{20}$ alkyl, preferably a $C_1$-$C_{10}$ alkyl, more preferably a $C_1$-$C_6$ alkyl and most preferably a $C_1$-$C_4$ alkyl. For example, R'' is a linear $C_1$-$C_{20}$ alkyl, preferably a linear $C_1$-$C_{10}$ alkyl, more preferably a linear $C_1$-$C_6$ alkyl and most preferably a linear $C_1$-$C_4$ alkyl.

In one embodiment of the present invention, R'' is methyl or ethyl.

n is preferably 0 or 1, more preferably 0.

Examples of suitable aluminum alkyls are trimethyl aluminum, triethyl aluminum, tri-n-octyl aluminum, tri-isobutylaluminium, trihexylaluminiumand isoprenyl aluminum and, Suitable halogenated aluminum cocatalysts are dialkyl aluminum chloride or alkyl aluminum dichloride, like diethylaluminium chloride, dimethylaluminium chloride, ethylaluminium dichloride or ethylaluminium sesquichloride, especially diethylaluminium chloride or dimethylaluminium chloride. Especially triethylaluminium is preferred.

Alternatively, the cocatalyst may be a mixture of compounds selected from the group consisting of tri-$C_1$-$C_{10}$ alkyl aluminum compounds, where one of the components comprises short-chained alkyl groups (1-3 carbon atoms) and the other component comprises long-chained alkyl groups (4-20 carbon atoms).

Examples of suitable aluminum alkyls comprising short-chained alkyl groups are trimethyl aluminum and in particular, triethyl aluminum. Examples of suitable components comprising long-chained alkyl groups are tri-n-octyl aluminum and in particular isoprenyl aluminum. In particular, the cocatalyst is a mixture of isoprenyl aluminum and triethyl aluminum or isoprenyl aluminum and trimethyl aluminum.

In the $C_2$-$C_{12}$ olefin polymerization catalyst system according to the present invention, the molar ratio between the aluminum in said cocatalyst and the titanium of said procatalyst is preferably 1:1 to 100:1, more preferably 3:1 to 60:1 and most preferably 5:1 to 50:1.

It has been found that by using the procatalyst as described above, it is possible to produce ethylene copolymers having a narrower molecular weight distribution and a higher molecular weight than when using a procatalyst not containing the electron donor compound (ED) as defined in the present invention in the same reactor conditions. Furthermore, the catalyst has rather high activity, has a high co-monomer response and is environmentally friendly.

The procatalyst and the cocatalyst may be contacted with each other prior to their introduction into the polymerization reactor. However, it is equally well possible to introduce the two catalyst components separately into the reactor.

Polymerisation Process

The procatalyst may be used in a process for producing ethylene copolymer. In particular, the process for producing ethylene copolymer comprises the steps of
(a) introducing a procatalyst as defined above into a polymerisation reactor
(b) introducing a cocatalyst, like a cocatalyst being an organometallic compound of formula (V) as in section "Catalyst", capable of activating the said procatalyst into the polymerisation reactor,
(c) introducing ethylene, $C_3$-$C_{12}$ α-olefins and optionally hydrogen into the polymerisation reactor;
(d) maintaining said polymerisation reactor in such conditions as to produce an ethylene copolymer.

Preferably the procatalyst is obtained by the process comprising the steps in the order of:
(a) contacting the inorganic support (IS) with an alkyl metal chloride (AMC) obtaining a first reaction product ($1^{st}$ RP),
(b) contacting said first reaction product ($1^{st}$ RP) with an electron donor compound (ED) obtaining a second reaction product ($2^{nd}$ RP), and
(c1) contacting said second reaction product ($2^{nd}$ RP) with a compound (M) or mixture (MI) obtaining a third reaction product ($3^{rd}$ RPa) and subsequently contacting said third reaction product ($3^{rd}$ RPa) with a titanium compound (TC) obtaining the procatalyst,
or
(c2) contacting said second reaction product ($2^{nd}$ RP) with a titanium compound (TC) obtaining a third reaction product ($3^{rd}$ RPb) and subsequently contacting said third reaction product ($3^{rd}$ RPb) with a compound (M) or mixture (MI) obtaining the procatalyst,
or
(c3) contacting said second reaction product ($2^{nd}$ RP) simultaneously with a compound (M) and a titanium compound (TC) or with a mixture (MI) and a titanium compound (TC) obtaining the procatalyst,
or
(c4) contacting said second reaction product ($2^{nd}$ RP) with a mixture of compound (M) and a titanium compound (TC) or with a mixture of a mixture (MI) and a titanium compound (TC) obtaining the procatalyst, wherein
(i) the alkyl metal chloride (AMC) is of formula (I)

$$R_n MeCl_{3-n} \qquad (I)$$

wherein
R is a $C_1$-$C_{20}$ alkyl group,
Me is a metal of group 13 of the Periodic Table, and
n is 1 or 2,
(ii) the compound (M) and the mixture (MI) comprise a hydrocarbyl and/or hydrocarbyl oxide linked to magnesium, preferably the compound (M) linked to magnesium is of formula (II) and the mixture (MI) comprise different compounds of formula (II), wherein formula (II) is $$Mg(R)_n(OR)_{2-n},$$

where n is 0, 1 or 2,
each R can be the same or different hydrocarbyl group of 1 to 20 C atoms;
(iii) the titanium compound (TC) is of formula (III)

$$(OR')_{4-x}TiCl_x \qquad (III)$$

wherein
R' is a $C_2$-$C_{20}$ hydrocarbyl group and
x is an integer of 3 or 4, and
(iv) the electron donor compound (ED) is a compound (C) comprising two oxygen containing rings, wherein said two rings are linked via a bridge selected from the group consisting of carbon bridge, silicon bridge, ethane-1,2-diyl bridge, ethene-1,2-diyl bridge, alkylaminomethyl bridge and imine bridge.

Preferably the compound (C) is of formula (IV) as defined in detail above. Further it is preferred that step (c1) is used.

With regard to further preferred embodiments of the process for the preparation of the procatalyst reference is made to the information provided above.

It is appreciated that the procatalyst can be used in any conventional polymerization process comprising the above-mentioned steps. Such processes include, among others, slurry polymerization process, fluidised bed gas phase polymerization process, agitated bed gas phase polymerization process and solution polymerization process. The catalyst component may also be used in a process which is a combination of the above mentioned processes.

In one alternative the procatalyst is used in gas phase copolymerisation of ethylene and alpha-olefin co-monomers having 3 to 12 carbon atoms. The polymerization in gas phase may be conducted in a fluidized bed reactor, in a fast fluidized bed reactor or in a settled bed reactor or in any combination of these. When a combination of reactors is used then the polymer is transferred from one polymerization reactor to another. Furthermore, a part or whole of the polymer from a polymerization stage may be returned into a prior polymerization stage. Typically the gas phase polymerization reactor is operated at a temperature within the range of from 50 to 100° C., preferably from 65 to 90° C. The pressure is suitably from 10 to 40 bar, preferably from 15 to 30 bar.

The polymerization may be conducted also in slurry reactor. Then the polymer particles formed in the polymerization, together with the catalyst fragmented and dispersed within the particles, are suspended in the fluid hydrocarbon. The slurry is agitated to enable the transfer of reactants from the fluid into the particles.

The polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the slurry polymerization is typically from 50 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor.

It is sometimes advantageous to conduct the slurry polymerization above the critical temperature and pressure of the fluid mixture. Such operation is described in U.S. Pat. No. 5,391,654.

In such operation the temperature is typically from 85 to 110° C., preferably from 90 to 105° C. and the pressure is from 40 to 150 bar, preferably from 50 to 100 bar.

Alternatively, the catalyst is used in a multi-step polymerization process, in the steps of which different amounts of hydrogen can be used as molecular weight regulating agent (so called chain transfer agent). Further, different amounts of comonomers can be used in each step. Thus, the polymer components produced in the two steps shall have different average molecular weights.

A typical multi-step polymerization process is a two-stage process, in which the hydrogen pressures deviate considerably from each other. A broad molecular weight distribution is usually obtained. One such process has been described in EP-B-517 868.

In a particularly preferred multi-step process, ethylene is copolymerized with one or more $C_3$-$C_{12}$ α-olefins in the presence of a polymerization catalyst comprising the components of steps (a) to (e) described above in two or more polymerization stages. In a first polymerization stage a first homo- or copolymer component having a weight average molecular weight of from 5000 to 50000 g/mol and a comonomer content of from 0 to 5 mol-% is produced. In a second polymerization stage a second copolymer component having a weight average molecular weight of from 300000 to 900000 g/mol and a comonomer content of from 0.5 to 10 mol-% is produced. The resulting polymer composition preferably comprises from 35 to 55% by weight of the low molecular weight component and 45 to 65% by weight of the high molecular weight component.

It has preferably a weight average molecular weight of from 150000 to 350000 g/mol and a comonomer content of from 1 to 7 mol-%. The first and second polymerization stages may be performed in any order and utilizing any reactor configuration. It is preferred, however, to conduct the first polymerization stage in a slurry-loop reactor and the second polymerization stage in the gas phase reactor. Suitable conditions for slurry- and gas phase reactors are disclosed above.

Then it is preferred to continuously or intermittently introduce the procatalyst, cocatalyst, ethylene, hydrogen, optionally comonomer and diluent into the loop reactor, withdraw the slurry continuously or intermittently from the loop reactor, pass it into a separation stage to remove at least part of the hydrocarbons, and direct the first polymer component into the gas phase reactor, together with additional ethylene, comonomer and optionally hydrogen and an eventual inert gas to produce the second copolymer component.

The resulting copolymer composition is then withdrawn from the gas phase reactor, either continuously or intermittently.

It should be understood that the multi-step process described above may include additional precontacting or prepolymerisation stages, where the catalyst is pre-treated or prepolymerised before it is introduced into the first polymerization stage. A process including a prepolymerisation stage has been described in WO-A-96/18662. The temperature in the prepolymerization step is typically from 0 to 90° C., preferably from 20 to 70° C. and more preferably from 30 to 60° C. The pressure is not critical and is typically from 1 to 150 bar, preferably from 10 to 100 bar.

In the polymerization process, said $C_3$-$C_{12}$ α-olefin monomer may be any monomer having from three to thirteen carbon atoms, such as propylene, 1-butene, isobutene, 3-methyl-1-butene, 1-hexene, 4-methyl-1-pentene, 4,4-dimethyl-1-pentene, vinylcyclohexane, cyclopentene, cyclobutene and norbornene. Most preferably, said $C_3$-$C_{12}$ α-olefin monomer is a $C_3$-$C_{10}$-α-olefin, like a $C_3$-$C_7$-α-olefin or $C_3$-$C_5$-α-olefin. For example, said $C_3$-$C_{12}$ α-olefin monomer is 1-butene or 1-hexene.

The present invention will now be described in further detail by the examples provided below.

EXAMPLES

The following non-limiting examples are provided in order to illustrate the invention and to compare it to the prior art.

1. Definitions/Measuring Methods

The following definitions of terms and determination methods apply for the above general description of the invention as well as to the below examples unless otherwise defined.

$MFR_2$ (190° C.) is measured according to ISO 1133 (190° C., 2.16 kg load).

$MFR_{21}$ (190° C.) is measured according to ISO 1133 (190° C., 21.6 kg load).

Density is measured according to ISO 1183-1—method A (2004). Sample preparation is done by compression moulding in accordance with ISO 1872-2:2007.

Porosity: BET with $N_2$ gas, ASTM 4641, apparatus Micromeritics Tristar 3000; sample preparation: at a temperature of 50° C., 6 hours in vacuum.

Surface area: BET with $N_2$ gas ASTM D 3663, apparatus Micromeritics Tristar 3000: sample preparation: at a temperature of 50° C., 6 hours in vacuum.

Bulk density is measured by using the method ASTM D 1895V.

Comonomer Content from PE (FTIR)

Comonomer content was determined in a known manner based on Fourier transform infrared spectroscopy (FTIR) determination using Nicolet Magna 550 IR spectrometer together with Nicolet Omnic FTIR software.

Films having a thickness of about 220 to 250 μm were compression molded from the samples. Similar films were made from calibration samples having a known content of the comonomer. The thicknesses were measured from at least five points of the film. The films were then rubbed with sandpaper to eliminate reflections. The films were not touched by plain hand to avoid contamination. For each sample and calibration sample at least two films were prepared. The films were pressed from pellets by using a Graceby Specac film press at 150° C. using 3+2 minutes preheating time, 1 minute compression time and 4 to 5 minutes cooling time. For very high molecular weight samples the preheating time may be prolonged or the temperature increased.

The comonomer content was determined from the absorbance at the wave number of approximately 1378 cm$^{-1}$. The comonomer used in the calibration samples was the same as the comonomer present in the samples. The analysis was performed by using the resolution of 2 cm$^{-1}$, wave number span of from 4000 to 400 cm$^{-1}$ and the number of sweeps of 128. At least two spectra were run from each film.

The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base line type. Also, the comonomer content of the unknown sample needs to be within the range of the comonomer contents of the calibration samples.

From the calibration samples a straight line is obtained as follows:

$$C_i = k \cdot \frac{A_{1378,i}}{s_i} + b$$

where
$C_1$ is the comonomer content of the calibration sample i
$A_{1378,i}$ is the absorbance at appr. 1378 cm$^{-1}$ of sample i
$s_i$ is the thickness of the film made of calibration sample i
k is the slope of the calibration line (obtained by regression analysis), and
b is the intercept of the calibration line (obtained by regression analysis).

By using the thus obtained parameters k and b the comonomer content of the samples were obtained from $$C_x = k \cdot \frac{A_{1378,x}}{s_x} + b$$

where
$C_x$ is the comonomer content of the unknown sample
$A_{1378,x}$ is the absorbance at appr. 1378 cm$^{-1}$ of the unknown sample
$s_x$ is the thickness of the film made of the unknown sample
k is the slope of the calibration line obtained from the calibration samples as above
b is the intercept of the calibration line obtained from the calibration samples.

The method gives the comonomer content in weight-% or in mol-%, depending on which was used in the calibration. If properly calibrated, the same approach may also be used to determine the number of methyl groups, i.e., CH$_3$ per 1000 carbon atoms.

2. Examples
Chemicals Used in the Examples
Silica—Grace Davison ES 757,
THF (tetrahydrofuran)—CAS no 109-99-9, supplier Scharlau
2,2-di(2-tetrahydrofuryl)propane (DTHFP), TCI Europe
EADC (ethyl-aluminium-di-chloride)—supplier Sigma-Aldrich
BOMAG (octyl-butyl-Mg)— (Mg(Bu)1,5(Oct)$_{0.5}$)—supplier Chemtura A. Catalyst Examples In the examples below the molar ratios (Donor/Mg) are ratios of components added during the catalyst preparation procedure.

Comparison Example 1 (CE1)—

No Donor

Silica calcinated at 600° C. for 6 h is used as carrier material. 5 g of silica is used for the synthesis. 1.1 mmol of 25% heptane solution of ethyl-aluminium-di-chloride (EADC) is added per gram of silica. The EADC is allowed to react with the silica at a temperature between 30° C. and 40° C. for 1 h. Subsequently, 1.0 mmol of a Mg-alcoholate solution is added per gram of silica. The Mg-solution is prepared by adding 2-ethyl-hexanol to an octyl-butyl-Mg (BOMAG) solution in a molar ratio of 1.83 to 1. The Mg-reagent is allowed to react with the EADC for 1½h at a temperature between 30° C. and 40° C. Heptane is added to create a slurry. The reaction temperature during the preparation is kept between 30° C. and 40° C. Subsequently, 0.5 mmol of TiCl$_4$ is slowly added per gram of silica during an addition time of ¼ h. The components are allowed to react with each other for 1 h. The reaction temperature is kept between 40° C. and 50° C. Finally, the catalyst is dried under a stream of nitrogen at a temperature between 60° C. and 90° C.

Comparative Example 2 (CE2)—

THF as Donor

The same catalyst is prepared according to the description of Comparative Example 1 except that 0.52 mmol of THF is added per gram of silica at a temperature between 30° C. and 40° C. over a period of 20 min after titanation (THF/Mg molar ratio 0.52)

Comparative Example 3 (CE3) —

DTHFP as Donor—Addition of DTHFP with Mg-Solution

The same recipe was used as in the Comparative example 1 with the exception that DTHFP was mixed with the Mg-alcoholate solution and thus DTHFP was added together with the Mg-alcoholate solution to the EADC treated silica. The DTHFP/Mg molar ratio was 0.25. Addition was done between 30° C. and 40° C. over a period of 20 min.

Comparative Example 4 (CE4) —

DTHFP as Donor—Addition of DTHFP with Mg-Solution

The same recipe was used as in the Comparison example 3, but the DTHFP/Mg molar ratio was 0.1.

Comparative Example 5 (CE5) —

DTHFP as Donor—Addition of DTHFP after Addition of TiCl$_4$

The same procedure was followed as in Comparative example 2, with the exception that the instead of THF, DTHFP was added after the TiCl$_4$ addition (DTHFP/Mg molar ration 0.25) at a temperature between 30-40° C., addition time was 20 min.

Comparative Example 6 (CE6) —

THF as Donor—Addition of THF after Addition of EADC

The same procedure was followed as in Inventive Example 1 with the exception that the THF was used instead of DTHFP (THF/Mg molar ratio 0.25). Addition time was 20 min and addition temperature 30° C.

Inventive Example 1 (IE1) —

DTHFP as Donor—Addition of DTHFP after Addition of EADC

The same procedure was followed as in Comparative Example 6 with the exception that instead of THF as donor DTHFP was used, which was added on the silica support after the addition of EADC but before the addition of the Mg-solution. DTHF/Mg molar ratio was 0.25, Addition time was 20 min and addition temperature 30° C.

Comparative Example 7 (CE7) —

DTHFP as Donor—Addition of DTHFP after Addition of EADC, Higher Donor/Mg Ratio

The same procedure was followed as in Inventive Example 1, but the molar ratio of DTHFP/Mg was 0.50.

B. Polymerisation Examples (ethylene-1-butene co-polymerization)

All the catalysts were tested in 1-butene copolymerization. 40 to 50 mg of catalyst was used in all the polymerizations and tri-ethylaluminium (TEA) was used as co-catalyst with an Al/Ti ratio of 30. The polymerizations were carried out in a 3 L bench scale reactor, whose procedure is as follows: To an empty 3 L reactor was added 55 ml of 1-butene using 0.2 bar of nitrogen pressure and stirring at 200 rpm was started. 1250 ml of propane was fed to the polymerization reactor as a polymerization medium. After addition of the reaction medium, hydrogen was introduced (0.75 bar) after which temperature was increased to 85° C. A batch of ethylene (3.7 bar) was added, then reactor pressure was allowed to be stable at 0.2 bar of overpressure and stirring speed was increased to 450 rpm. Then the catalyst and the co-catalyst were added through automatic feeding using $N_2$ and 100 ml of propane. The total reactor pressure was 38 bar, which was maintained by continuos ethylene feed.

Polymerization time was 60 min after which the polymerization was stopped by venting off the monomer together with the reaction medium. Activity of the catalyst was measured on the basis of the amount of polymer produced. Some information about the molecular weight and molecular weight broadness was received through MFR values. The butene-co-monomer amount was measured by IR. The results are listed in Table 1.

TABLE 1

The polymerization results

| | | Example | | | | | | | |
|---|---|---|---|---|---|---|---|---|---|
| | | CE1 | CE2 | CE3 | CE4 | CE5 | CE6 | IE1 | CE6 |
| Donor | | no | I | II | II | II | I | II | II |
| Donor amount | (mol/mol)[1] | 0 | 0.52 | 0.25 | 0.1 | 0.25 | 0.25 | 0.25 | 0.50 |
| Activity | [kg PO/g][2] | 4.4 | 2.7 | 0.1 | 0.8 | 0.4 | 0.53 | 4.0 | 0.02 |
| C4[3] | [wt.-%] | 4.2 | 4.6 | — | 2.9 | — | 6.2 | 3.5 | — |
| BD[4] | [kg/m$^3$] | 410 | 390 | — | 410 | — | — | 425 | — |
| $MFR_2$ | [g/10 min] | 2.7 | 2.1 | — | n.d.[6] | — | 7.8 | 1.5 | — |
| $MFR_{21}$ | [g/10 min] | 71.6 | 52.5 | — | 13.3 | — | — | 37.7 | — |
| FRR[5] | [—] | 26.5 | 25 | — | n.d. | — | — | 25.1 | — |

[1] Donor/Mg
[2] "PO" means produced ethylene-1-butene copolymer,
[3] "C4" means 1-butene
[4] "BD" means Bulk density,
[5] "FRR" means $MFR_{21}/MFR_2$
[6] not determined
I THF
II DTHFP Polymer of comparative examples CE3, CE5 and CE6 was not analyzed due to the very poor activity.

The results show that the DTHFP donor has to be added on the silica after the EADC addition to achieve a reasonable activity in co-polymerization. Further, the results show that too high donor amounts result in loss of activity.

A narrower molecular weight distribution is achieved (FRR=25.1) for IE1 compared to CE1.

It can be seen that molecular weight of IE1 is higher than of CE1 and CE2 (lower MFR's). In CE4 molecular weight is still higher than in IE1, but the activity is very low and C4 incorporation smaller.

Bulk density is also higher in the present invention.

The invention claimed is:

1. A process for producing a procatalyst, wherein the process comprises the steps in the order of:
    (a) contacting an inorganic support (IS) with an an alkyl metal chloride (AMC) to obtain a first reaction product ($1^{st}$ RP),
    (b) contacting said first reaction product ($1^{st}$ RP) with an electron donor compound (ED) to obtain a second reaction product ($2^{nd}$ RP),
    (c1) contacting said second reaction product ($2^{nd}$ RP) with a compound (M) or mixture (MI) to obtain a third reaction product ($3^{rd}$ RPa) and subsequently contacting said third reaction product ($3^{rd}$ RPa) with a titanium compound (TC) to obtain the procatalyst, or (c2) contacting said second reaction product ($2^{nd}$ RP) with a titanium compound (TC) to obtain a third reaction product ($3^{rd}$ RPb) and subsequently contacting said third reaction product ($3^{rd}$ RPb) with a compound (M) or mixture (MI) to obtain the procatalyst, or (c3) contacting said second reaction product ($2^{nd}$ RP) simultaneously with a compound (M) and a titanium compound (TC) or with a mixture (MI) and a titanium compound (TC) to obtain the procatalyst, or (c4) contacting said second reaction product ($2^{nd}$ RP) with a mixture of compound (M) and a titanium compound (TC) or with a mixture of a mixture (MI) and a titanium compound (TC) to obtain the procatalyst, wherein:

(i) the alkyl metal chloride (AMC) is of formula (I):

  (I)

wherein:
R is a $C_1$-$C_{20}$ alkyl group,
Me is a metal of group 13 of the Periodic Table, and
n is 1 or 2, (ii) the compound (M) and the mixture (MI) comprise a hydrocarbyl and/or hydrocarbyl oxide linked to magnesium, (iii) the titanium compound (TC) is of formula (III):

$(OR')_{4-x}TiCl_x$  (III)

wherein:
R' is a $C_2$-$C_{20}$ hydrocarbyl group and
x is an integer of 3 or 4, and (iv) the electron donor compound (ED) is a compound (C) comprising two oxygen-containing rings, wherein said two rings are linked via a bridge selected from the group conisting of carbon bridge, silicon bridge, ethane-1,2-diyl bridge, ethene-1,2-diyl bridge, alkylaminomethyl bridge and imine bridge.

2. The process according to claim 1, wherein the compound (C) is of formula (IV):

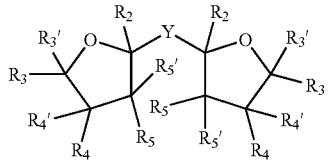

wherein:
Y is selected from the group consisting of $C(R_1)_2$, $Si(R_1)_2$, $CHR_1$—$CHR_1$, $CR_1$=$CR_1$, $CHR_1$—$NR_1$, and $CR_1$=N, wherein each $R_1$ can be the same or different and can be hydrogen, a linear or branched $C_1$ to $C_8$-alkyl group, or a $C_2$-$C_8$-alkylene group, or two of $R_1$ can form together an optionally substituted aliphatic 3 to 6 membered ring with the C or Si-atoms they are attached to and $R_2$, $R_3$, $R_{3'}$, $R_4$, $R_{4'}$, $R_5$ and $R_{5'}$ are the same or different and can be hydrogen, a linear or branched $C_1$ to $C_8$-alkyl, or a $C_3$-$C_8$-alkylene group, wherein two or more of $R_2$, $R_3$, $R_{3'}$, $R_4$, $R_{4'}$, $R_5$ and $R_{5'}$ can form a ring, or any two neighbored $R_2$, $R_3$, $R_4$ and $R_5$ can represent a double bond, and optionally at least one of the C-atoms in the oxygen-containing rings can be replaced by a heteroatom selected from O, N and P.

3. The process according to claim 2, wherein:
Y is $C(R_1)_2$ or $Si(R_1)_2$,
$R_1$ are the same and are a linear or branched $C_1$ to $C_5$-alkyl group,
$R_2$, $R_3$, $R_{3'}$, $R_4$, $R_{4'}$, $R_5$ and $R_{5'}$ are the same or different and can be hydrogen, linear or branched $C_1$ to $C_5$-alkyl group.

4. The process according to claim 1, wherein the compound (C) is 2,2-di(2-tetrahydrofuryl)propane (DTHFP).

5. The process according to claim 1, wherein the inorganic support (IS) is an inorganic oxide having surface hydroxyl groups.

6. The process according to claim 1, wherein the metal Me of the alkyl metal chloride (AMC) of formula (I) is Al.

7. The process according to claim 1, wherein the compound (M) is of formula (II) and the mixture (MI) comprises a mixture of compounds of formula (II), wherein formula (II) is:

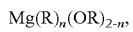

where n is 0, 1 or 2,
each R can be the same or different hydrocarbyl group of 1 to 20 C atoms.

8. The process according to claim 1, wherein the molar ratio of ED/Mg is 0.01 to below 0.40.

9. A procatalyst comprising:
(a) an inorganic support (IS),
(b) a chlorine compound carried on said support,
(c) a magnesium compound carried on said support,
(d) a titanium compound carried on said support, and
(e) an electron donor compound (ED) being a compound (C) comprising two oxygen containing rings, wherein said two rings are linked via a bridge selected from the group consisting of carbon bridge, silicon bridge, ethane-1,2-diyl bridge, ethene-1,2-diyl bridge, alkylaminomethyl bridge and imine bridge, wherein the procatalyst is produced according to claim 1.

10. The procatalyst according to claim 9, wherein the compound (C) is of formula (IV):

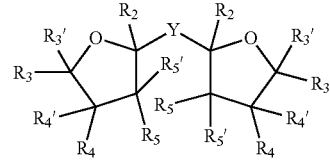

wherein:
Y is selected from the group consisting of $C(R_1)_2$, $Si(R_1)_2$, $CHR_1$—$CHR_1$, $CR_1$=$CR_1$, $CHR_1$—$NR_1$, and $CR_1$=N, wherein each $R_1$ can be the same or different and can be hydrogen, a linear or branched $C_1$ to $C_8$-alkyl group, or a $C_2$-$C_8$-alkylene group, or the two of $R_1$ can form together an optionally substituted aliphatic 3 to 6 membered ring with the C or Si-atoms they are attached to and $R_2$, $R_3$, $R_{3'}$, $R_4$, $R_{4'}$, $R_5$ and $R_{5'}$ are the same or different and can be hydrogen, a linear or branched $C_1$ to $C_8$-alkyl, or a $C_3$-$C_8$-alkylene group, wherein two or more of $R_2$, $R_3$, $R_{3'}$, $R_4$, $R_{4'}$, $R_5$ and $R_{5'}$ can form a ring, or any two neighbored $R_2$, $R_3$, $R_4$ and $R_5$ can represent a double bond, and optionally at least one of the C-atoms in the oxygen-containing rings can be replaced by a heteroatom selected from O, N and P.

11. The procatalyst according to claim 10, wherein in formula (IV):

Y is $C(R_1)_2$ or $Si(R_1)_2$, $R_1$ are the same and are a linear or branched $C_1$ to $C_5$-alkyl group, $R_2$, $R_3$, $R_{3'}$, $R_4$, $R_{4'}$, $R_5$ and $R_{5'}$ are the same or different and can be hydrogen, linear or branched $C_1$ to $C_5$-alkyl group.

12. The procatalyst according to claim 9, wherein the compound (C) is 2,2-di(2-tetrahydrofuryl)propane (DTHFP).

13. The procatalyst according to claim 9, wherein the molar ratio of ED/Mg is 0.01 to below 0.40.

14. A catalyst system comprising a procatalyst according to claim 9, and an activating cocatalyst of formula (V):

$$R''_{3-n}AlX_n \qquad (V)$$

wherein

R" is a $C_1$ to $C_{20}$ alkyl,

X is halogen, and n is 0, 1 or 2.

15. A process for producing an ethylene copolymer, comprising:
  (a) introducing a procatalyst according to claim 9 into a polymerisation reactor;
  (b) introducing a cocatalyst, which activates the procatalyst, into the polymerization reactor, wherein the cocatalyst is an organometallic compound of formula (V) as defined in claim 14;
  (c) introducing ethylene, $C_3$-$C_{12}$ α-olefins and optionally hydrogen into the polymerisation reactor, and
  (d) copolymerizing said ethylene and $C_3$-$C_{12}$ α-olefins in said polymerisation reactor to produce an ethylene copolymer.

* * * * *